United States Patent
Sawai et al.

(10) Patent No.: US 10,946,830 B2
(45) Date of Patent: Mar. 16, 2021

(54) SEATBELT CONTROL DEVICE

(71) Applicant: TOYOTA JIDOSHA KABUSHIKI KAISHA, Toyota (JP)

(72) Inventors: Shunichiroh Sawai, Numazu (JP);
Takeshi Matsumura, Numazu (JP);
Jun Sato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 118 days.

(21) Appl. No.: 16/458,257

(22) Filed: Jul. 1, 2019

(65) Prior Publication Data

US 2020/0023810 A1 Jan. 23, 2020

(30) Foreign Application Priority Data

Jul. 18, 2018 (JP) .............................. JP2018-135170

(51) Int. Cl.
*B60R 22/44* (2006.01)
*B60R 22/46* (2006.01)

(52) U.S. Cl.
CPC .............. *B60R 22/44* (2013.01); *B60R 22/46* (2013.01); *B60R 2022/4473* (2013.01); *B60R 2022/4666* (2013.01)

(58) Field of Classification Search
CPC ......... B60R 22/44; B60R 22/46; B60R 22/45; B60R 22/195; B60R 2022/4473; B60R 2022/4666; B60R 2022/4685; B60R 2022/4841; B60R 2022/4842
USPC .................................................. 180/26, 268
See application file for complete search history.

(56) References Cited

U.S. PATENT DOCUMENTS

| | | | | |
|---|---|---|---|---|
| 6,485,057 | B1 * | 11/2002 | Midorikawa | B60R 21/01 280/801.1 |
| 7,533,906 | B2 * | 5/2009 | Luettgen | H01R 35/00 285/146.1 |
| 7,681,683 | B2 * | 3/2010 | Takao | B60R 22/46 180/268 |

(Continued)

FOREIGN PATENT DOCUMENTS

JP 2004276896 A * 10/2004
JP 2007-022400 A 2/2007

(Continued)

*Primary Examiner* — Paul N Dickson
*Assistant Examiner* — Caitlin A Miller
(74) *Attorney, Agent, or Firm* — Sughrue Mion, PLLC (57) ABSTRACT

A seatbelt control device comprises a kinesthetic warning control part that is provided with a fitting operation part performing a fitting operation controlling a time for making the motor operate forward based on a motor current value when making the motor operate forward and controlling a belt tightness to an initial belt tightness, and a kinesthetic warning operation part performing a kinesthetic warning operation making the tightness of the seatbelt rise in stages from the initial belt tightness by repeating a forward operation making the motor operate forward and at least one operation of a braking operation short-circuiting the terminals of the motor to render the motor a short brake state or a reverse operation making the motor operate in reverse and k configured to perform the fitting operation before performing the kinesthetic warning operation on the seated passenger.

5 Claims, 4 Drawing Sheets

(56) References Cited

U.S. PATENT DOCUMENTS

| | | | |
|---|---|---|---|
| 7,686,118 B2 * | 3/2010 | Akaba | B60R 21/013 180/268 |
| 7,858,104 B2 * | 12/2010 | Simonnet | A61Q 1/02 424/400 |
| 2007/0018445 A1 * | 1/2007 | Inuzuka | B60R 22/44 280/806 |
| 2007/0144811 A1 * | 6/2007 | Tanaka | B60R 22/46 180/268 |

FOREIGN PATENT DOCUMENTS

| JP | 2008-179321 A | | 8/2008 |
|---|---|---|---|
| JP | 2008179321 A | * | 8/2008 |

\* cited by examiner

SEATBELT CONTROL DEVICE

FIELD

The present disclosure relates to a seatbelt control device.

BACKGROUND

Japanese Unexamined Patent Publication No. 2007-022400 discloses, as a conventional seatbelt control device, one which repeatedly performs an operation changing a tension acting on a seatbelt (webbing) for restraining a seated passenger of a vehicle a plurality of times, that is, alternately repeatedly performs a seatbelt takeup operation and pullout operation so as to enable a seated passenger to be warned kinesthetically by the seatbelt.

SUMMARY

However, the above-mentioned conventional seatbelt control device was configured so that the amount of belt takeup by the takeup operation of the seatbelt at the start of the kinesthetic warning becomes larger than the amount of belt takeup of the seatbelt at the end of the kinesthetic warning.

The tightness of the seatbelt against the seated passenger (below, referred to as the "belt tightness") changes according to the posture, clothing, etc. of the seated passenger. Therefore, if the belt tightness was high before the kinesthetic warning, if making the amount of belt takeup at the start of the kinesthetic warning relatively large like in the above-mentioned conventional seatbelt control device, the seated passenger would be liable to be excessively fastened at the start of the kinesthetic warning. On the other hand, if the belt tightness was low, even if making the amount of belt takeup at the start of the kinesthetic warning relatively large like in the above-mentioned conventional seatbelt control device, the seated passenger would be liable to be unable to be sufficiently fastened by the seatbelt and the effectiveness of the kinesthetic warning by the seatbelt would be liable to fall.

In this way, in the above-mentioned conventional seatbelt control device, sometimes the seated passenger cannot be suitably warned kinesthetically by the seatbelt.

The present disclosure was made focusing on such a problem and has as its object to keep a seated passenger from being unable to be suitably warned kinesthetically by the seatbelt.

To solve the above problem, the seatbelt system according to one aspect of the present disclosure is provided with a seatbelt for restraining a seated passenger in a seat, a spool for taking up the seatbelt, an elastic member for imparting to the spool a force for making the spool rotate in a belt takeup direction when the seatbelt is pulled out, a motor able to operate forward and in reverse, and a force transmission mechanism configured to make the spool rotate in the belt takeup direction when making the motor operate forward and disconnect the spool and the motor when making the motor operate in reverse. The seatbelt control device for controlling this seatbelt system is provided with a kinesthetic warning control part for changing the tightness of the seatbelt against a seated passenger to thereby warn the seated passenger kinesthetically by the seatbelt. The kinesthetic warning control part is provided with a fitting operation part performing a fitting operation controlling the time of making the motor operate forward based on the value of a current flowing through the motor when making the motor operate forward to control the tightness of the seatbelt to a predetermined initial belt tightness and a kinesthetic warning operation part performing a kinesthetic warning operation making the tightness of the seatbelt rise in stages from the initial belt tightness by repeating a forward operation making the motor operate forward and at least one operation of a braking operation short-circuiting the terminals of the motor to render the motor a short brake state or a reverse operation making the motor operate in reverse and is configured to perform the fitting operation before the kinesthetic warning operation.

According to this aspect of the present disclosure, it is possible to prevent a seated passenger from being unable to be suitably warned kinesthetically by the seatbelt.

DESCRIPTION OF EMBODIMENTS

Below, referring to the drawings, embodiments of the present disclosure will be explained in detail. Note that, in the following explanation, similar component elements will be assigned the same reference notations.

First Embodiment

Figure 1:
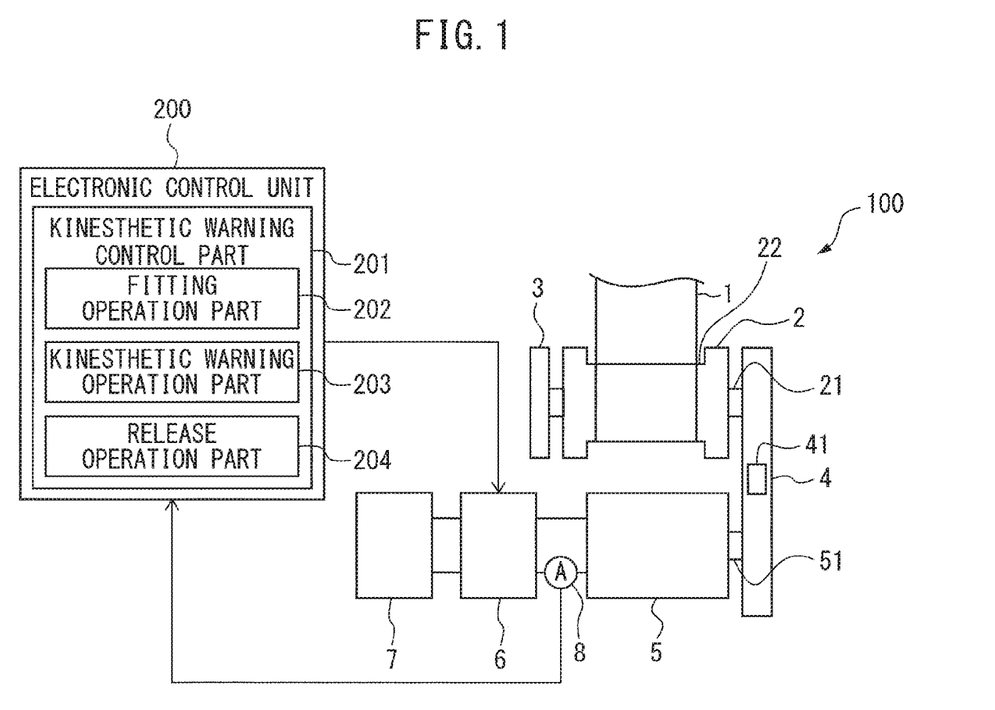
FIG. 1 is a schematic view of the configuration of a seatbelt system according to a first embodiment of the present disclosure and of an electronic control unit for controlling the seatbelt system.

FIG. 1 is a schematic view of the configuration of a seatbelt system 100 according to a first embodiment of the present disclosure and of an electronic control unit 200 for controlling the seatbelt system 100.

The seatbelt system 100 is a system attached to a seat of for example a vehicle or other moving body and restraining a seated passenger at the seat. The seatbelt system 100 according to the present embodiment is provided with a seatbelt 1, spool 2, spiral spring 3, force transmission mechanism 4, motor 5, voltage adjustment circuit 6, battery 7, and current sensor 8.

The seatbelt 1 is a long belt for restraining a seated passenger at a seat.

The spool 2 is provided with a spool rotational shaft 21 and a cylindrically shaped belt takeup part 22 fastened to the spool rotational shaft 21 and rotating integrally with the spool rotational shaft 21 and is a member for taking up the seatbelt 1 in layers at the outer circumferential surface of the belt takeup part 22 for storage. A base end part of the seatbelt 1 is fastened to the outer circumferential surface of the belt takeup part 22. The spool rotational shaft 21 is made to rotate in one direction (takeup direction) so that the seatbelt 1 is taken up from the base end side at the belt takeup part 22. On the other hand, by pulling the seatbelt 1 from the front end side, the spool rotational shaft 21 rotates in the opposite direction (pullout direction) and the seatbelt 1 taken up at the belt takeup part 22 is pulled out.

The spiral spring 3 is attached to one end part of the spool rotational shaft 21 (left side in the figure). When the spool rotational shaft 21 is made to rotate in the pullout direction, the spiral spring 3 imparts to the spool rotational shaft 21 a force making the spool rotational shaft 21 rotate in the takeup direction. That is, when the seatbelt 1 is pulled out, the spiral spring 3 causes the generation of a force for rewinding the seatbelt 1. The force by which the spiral spring 3 makes the spool rotational shaft 21 rotate in the takeup direction changes depending on the amount by which the seatbelt 1 is pulled out (below, referred to as the "amount of belt pullout". The greater the amount of belt pullout, the greater the force.

Due to the spring force of this spiral spring 3, at the time the belt is worn, it is possible to generate a suitable tension corresponding to the amount of belt pullout at the seatbelt 1 and use the seatbelt 1 to restrain the seated passenger at the seat, while at the time of not attaching the belt (when no force is acting in a direction pulling out the seatbelt 1), the seatbelt 1 can be taken up at the belt takeup part 22 for storage.

The force transmission mechanism 4 is connected to the other end part of the spool rotational shaft 21 (right side in figure) and the motor output shaft 51. The force transmission mechanism 4 has a clutch 41 inside it. It is configured so that when a positive voltage is given to the motor 5 and the motor output shaft 51 is made to rotate forward, the clutch 41 can be engaged and the spool rotational shaft 21 can be made to rotate in the takeup direction and is configured so that when a negative voltage is given to the motor 5 and the motor output shaft 51 is made to rotate in reverse, the clutch 41 can be disengaged and thereby the spool rotational shaft 21 and motor output shaft 51 can be disconnected.

The motor 5 is driven when performing the later explained kinesthetic warning control and is made to rotate through the force transmission mechanism 4 to make the spool rotational shaft 21 rotate in the takeup direction. The motor 5 is connected through the voltage adjustment circuit 6 to the battery 7 for adjusting the voltage supplied to the motor 5 (below, referred to as the "motor supply voltage"). The motor supply voltage is controlled to any voltage by control of the voltage adjustment circuit 6 by the electronic control unit 200.

In the present embodiment, as the motor 5, a DC motor is used. The higher the motor load, the greater the value of the current flowing through the motor 5 (below, referred to as the "motor current value") when supplying voltage to the motor 5 proportionally to the motor load. The motor current value is designed to be able to be detected by the current sensor 8. The output signal of the current sensor 8 is designed to be input to the electronic control unit 200.

The motor load changes in accordance with the belt tightness (tightness of seatbelt 1 against seated passenger) when the clutch 41 of the force transmission mechanism 4 is engaged at the time the belt is worn. Specifically, for example, if there is a suitable gap between the seatbelt 1 and the seated passenger or otherwise when the belt tightness is low, the force required for taking up the seatbelt 1 can be kept small, so the motor load becomes lower. Further, if the belt tightness gradually becomes higher and the seatbelt 1 presses against the seated passenger, as the belt tightness becomes higher, the force required for taking up the seatbelt 1 becomes larger, so the motor load also rises.

Figure 2:
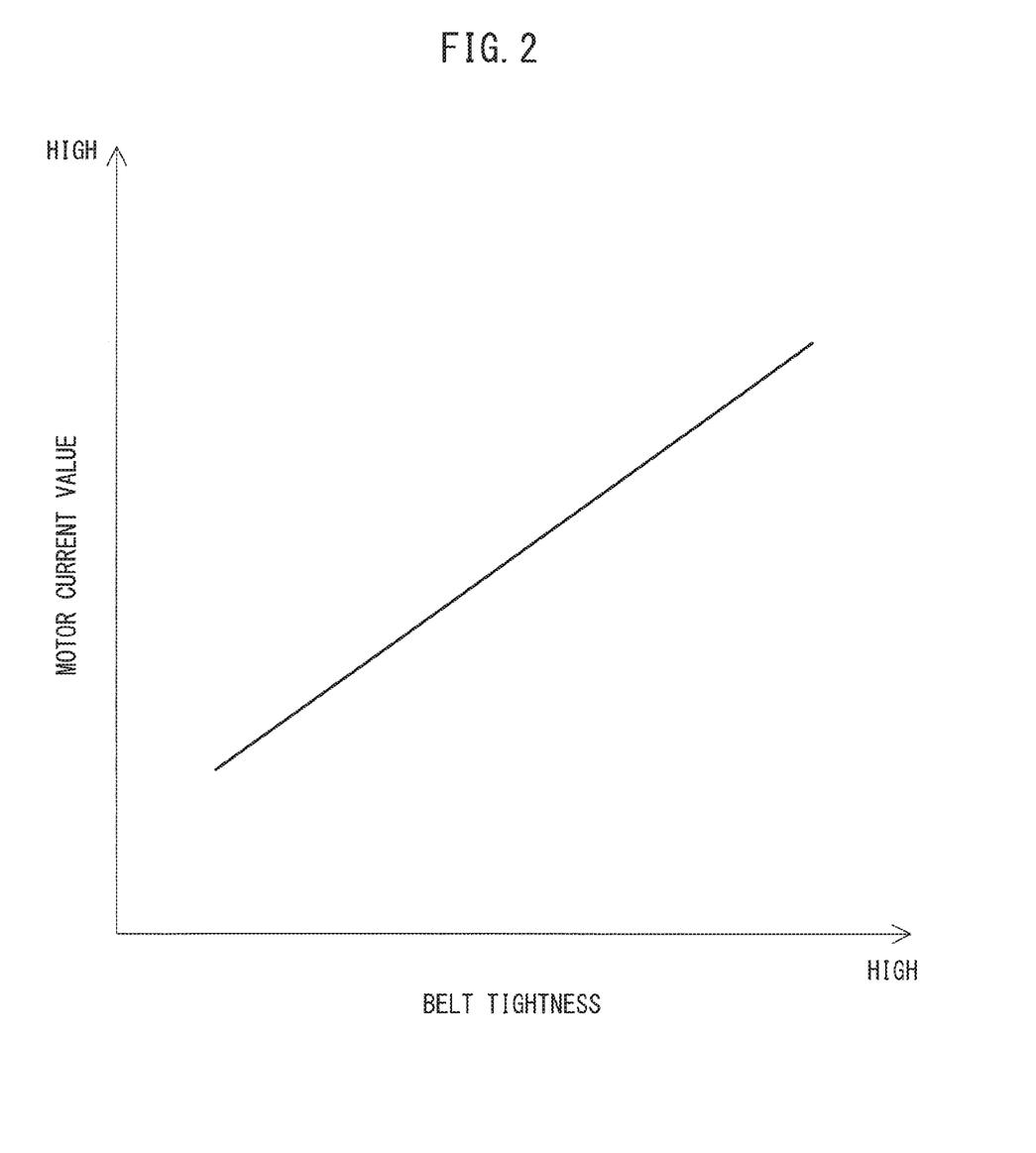
FIG. 2 is a view showing a relationship of a motor current value and belt tightness when controlling a motor supply voltage to a certain voltage (positive voltage) at the time the belt is worn.

In this way, the motor load is in a correlative relationship with the belt tightness, so as shown in FIG. 2, there is a correlative relationship between the motor current value and the belt tightness.

FIG. 2 is a view showing the relationship between the motor current value and the belt tightness when controlling the motor supply voltage to a certain voltage (positive voltage) to make the motor 5 operate forward at the time the belt is worn. As shown in FIG. 2, as the belt tightness becomes higher, the motor load becomes higher, so the motor current value also becomes higher.

Therefore, in the seatbelt system 100 according to the present embodiment, it is possible to estimate the belt tightness by monitoring the motor current value when supplying a positive voltage to the motor 5 to make the spool rotational shaft 21 rotate.

Returning to FIG. 1, the electronic control unit 200 is a microcomputer provided with components connected with each other by a bidirectional bus such as a central processing unit (CPU), read only memory (ROM), random access memory (RAM), input port, and output port.

The electronic control unit 200 is provided with a kinesthetic warning control part 201 changing a belt tightness when a kinesthetic warning is requested so as to warn the seated passenger kinesthetically by the seatbelt 1. As the timing for a request for a kinesthetic warning, for example, if the seatbelt system 100 is attached to the driver's seat of the vehicle, the time of requesting a switch from the automated driving mode, where driving operations relating to acceleration, steering, and braking are automatically performed to drive the vehicle, to a manual driving mode may be mentioned. Further, the time when it is judged from information on the appearance of the driver captured by a driver monitor camera, etc., that the driver is asleep at the wheel or other times when it is necessary to raise the degree of awakeness of the driver may be mentioned.

In this regard, the belt tightness before the kinesthetic warning changes depending on the posture or clothing of the seated passenger, the amount of belt pullout when the seated passenger fastens the belt, etc. Therefore, if the belt tightness before the kinesthetic warning was high, if raising the belt tightness by a kinesthetic warning, the seated passenger is liable to be excessively fastened. On the other hand, if the belt tightness was low, at the start of the kinesthetic warning, the seated passenger cannot be sufficiently fastened by the seatbelt 1 and the efficacy of the kinesthetic warning is liable to fall.

In this way, the degree of fastening by the seatbelt 1 felt by the seated passenger at the time of a kinesthetic warning changes in accordance with the belt tightness before the kinesthetic warning. In other words, variation occurs in the degree of fastening by the seatbelt 1 at the time of a kinesthetic warning in accordance with the belt tightness before the kinesthetic warning. This variation is liable to be felt as a variation in quality.

Further, after the kinesthetic warning, the belt tightness is raised and the seated passenger is in a state fastened by the seatbelt 1, therefore this cannot be said to be a pleasant state for the seated passenger. If the seated passenger himself has to adjust the amount of belt pullout to lower the belt tightness, it would be extremely troublesome. Therefore, after the kinesthetic warning, it is preferable to naturally return the belt tightness to the state before the kinesthetic warning.

Therefore, in the present embodiment, before actually performing a kinesthetic warning operation raising the belt tightness in stages, it was decided to first perform a fitting operation controlling the belt tightness to a predetermined initial belt tightness set in advance. Further, after performing the kinesthetic warning operation, it was decided to naturally cause the increased belt tightness to return toward the initial belt tightness. That is, in the present embodiment, the kinesthetic warning control part 201 was configured provided with the fitting operation part 202, the kinesthetic warning operation part 203, and the release operation part 204. Below, referring to FIG. 3, the operation of kinesthetic warning control according to the present embodiment will be explained.

Figure 3:
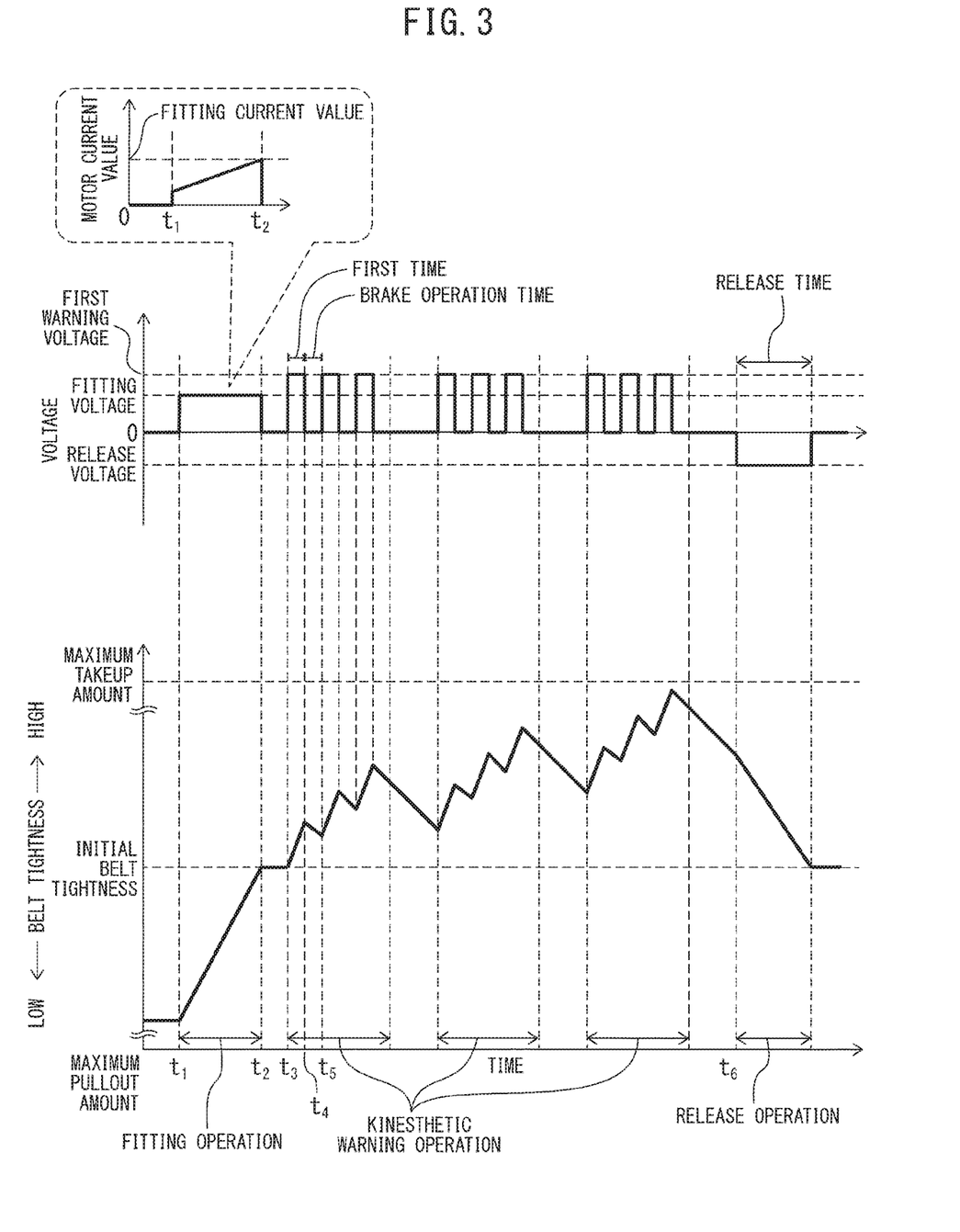
FIG. 3 is a time chart explaining an operation of kinesthetic warning control according to the first embodiment of the present disclosure.

FIG. 3 is a time chart explaining the operation of kinesthetic warning control according to the present embodiment.

If at the time t1 a kinesthetic warning is requested, the electronic control unit 200 first performs a fitting operation controlling the belt tightness to a preset initial belt tightness.

Specifically, since there is a correlative relationship between the motor current value and belt tightness as explained above, the electronic control unit 200 controls the voltage adjustment circuit 6 so that the motor supply voltage becomes a predetermined fitting voltage (positive voltage) and uses the motor 5 to make the spool rotational shaft 21 rotate in the takeup direction to take up the seatbelt 1 until the motor current value becomes a current value corresponding to the initial belt tightness (below, referred to as the "fitting current value"). That is, the electronic control unit 200 controls the time for making the motor 5 operate forward based on the motor current value when making the motor 5 operate forward to control the tightness of the seatbelt 1 to a predetermined initial belt tightness.

If at the time t2 the motor current value reaches the fitting current value, the electronic control unit 200 makes the fitting operation end.

Specifically, the electronic control unit 200 controls the voltage adjustment circuit 6 to short-circuit the terminals of the motor 5 to render the motor 5 a short brake state. Due to this, it is possible to make the motor output shaft 51 stop and keep the motor output shaft 51 from freely rotating after making it stop, so the belt tightness is maintained at the initial belt tightness.

Further, at the time t3 after the elapse of a predetermined time from when making the fitting operation end, the electronic control unit 200 actually performs a kinesthetic warning operation raising the belt tightness in stages.

Specifically, the electronic control unit 200 controls the first motor supply voltage to a predetermined first warning voltage (positive voltage) for exactly a predetermined first time from the time t3 (for example, tens to hundreds of ms) and performs an operation using the motor 5 to make the spool rotational shaft 21 rotate in the takeup direction to take up the seatbelt 1. That is, it performs an operation using the seatbelt 1 to fasten a seated passenger for exactly the first time and raise the belt tightness from the initial belt tightness.

Next, the electronic control unit 200 performs an operation temporarily lowering the increased belt tightness to temporarily lighten the fastening action by the seatbelt 1 in the period from the time t4 to the time t5 after controlling the motor supply voltage to the first warning voltage for exactly the first time.

Specifically, for exactly a predetermined braking operation time from the time t4 (for example tens to hundreds of ms), the electronic control unit 200 short-circuits the terminals of the motor 5 to render the motor 5 a short brake state. It makes the motor output shaft 51 stop and keeps the motor output shaft 51 from freely rotating after being stopped.

Before the braking operation period rendering the motor 5 a short brake state, the motor supply voltage is controlled to the first warning voltage and the seatbelt 1 is taken up further from the state of the initial belt tightness. Further, the state where the belt tightness becomes higher than the initial belt tightness is a state where the seatbelt 1 tightly contacts the seated passenger and fastens the seated passenger, so the seatbelt 1 receives a reaction force corresponding to the belt tightness from the seated passenger and a force acts on the seatbelt 1 in a direction pulling out the seatbelt 1. For this reason, in the braking operation period from this time t4 on, a reaction force acting to pull out the seatbelt 1 by exactly the amount taken up during the period of controlling the motor supply voltage to the first warning voltage acts from the seated passenger.

Therefore, due to the reaction force received from the seated passenger, the seatbelt 1 is pulled out and the motor 5 is made to operate in reverse through the force transmission mechanism 4, but the motor 5 is rendered a short brake state, so a braking force acting to restrain reverse operation of the motor 5 (electromagnetic dynamic load due to short brake state) is generated. As a result, from the time t4 on, the seatbelt 1 is pulled out until the reaction force received from this seated passenger falls below the braking force acting to restrain reverse operation of the motor 5 and the belt tightness falls toward the initial belt tightness. Note that, this FIG. 3 shows the example where in the braking operation period from this time t4 to time t5, the reaction force received from the seated passenger exceeds the braking force acting to restrain reverse operation of the motor 5. Further, in the present embodiment, the braking operation time is set so that the belt tightness does not fall to the initial belt tightness in this braking operation period.

Further, at the time t5 before the belt tightness falls to the initial belt tightness, the electronic control unit 200 again controls the motor supply voltage to the first warning voltage for exactly the first time and alternately performs this series of operations, that is, the forward operation making the motor 5 operate forward and the braking operation short-circuiting the terminals of the motor 5 to render the motor 5 a short brake state. In the present embodiment, repetition of this series of operations three times is counted as one kinesthetic warning operation and a total of three kinesthetic warning operations are consecutively performed.

By repeating this series of operations, as shown in FIG. 3, it is possible to gradually raise the belt tightness from the initial belt tightness and gradually strengthen the fastening action by the seatbelt 1. For this reason, in a single kinesthetic warning operation, it is possible to raise the degree of alertness due to the kinesthetic warning in stages, so it is possible to perform a kinesthetic warning flexibly and raise the effect of the kinesthetic warning.

Further, at the time t6 after performing the kinesthetic warning operation, the electronic control unit 200 performs a release operation for naturally returning the belt tightness raised by performing the kinesthetic warning operation toward the initial belt tightness.

Specifically, the electronic control unit 200 controls the motor supply voltage to a predetermined release voltage (negative voltage) for exactly a predetermined release time (for example 500 ms). It uses the motor 5 to make the spool rotational shaft 21 rotate in the pullout direction to make a force in a direction pulling out the seatbelt 1 temporarily act on the seatbelt 1 and disengages the clutch 41 of the force transmission mechanism 4 to disconnect the spool rotational shaft 21 and the motor output shaft 51. Due to this, no braking force acting to restrain reverse operation of the motor 5 (electromagnetic dynamic load due to short brake state) is generated any longer, so compared with when rendering the motor 5 a short brake state, it is possible to increase the speed of drop of the belt tightness and possible to naturally pull out the seatbelt 1 by the reaction force received by the seatbelt 1 from the seated passenger and possible to lower the belt tightness to the initial belt tightness.

For this reason, after performing the kinesthetic warning operation, without making the seated passenger himself adjust the amount of belt pullout, it is possible to return the state from one where the seatbelt 1 is in the process of fastening the seated passenger to one where it is suitably fastening him. Note that in the example shown in FIG. 3, the case is shown where the end timing of the release operation and the point of time when the belt tightness becomes the initial belt tightness match, but these timings do not necessarily have to match. The release time need only be suitably set so that the belt tightness becomes the initial belt tightness before the release operation ends.

Further, in the present embodiment, during the release operation, the motor supply voltage continues to be controlled to the release voltage, but if once the clutch 41 of the force transmission mechanism 4 is disengaged, the seatbelt 1 is naturally pulled out by the reaction force received from the seated passenger, so it is also possible to operate the motor 5 in reverse at the time of start of the release operation to disengage the clutch 41 of the force transmission mechanism 4 and then stop the supply of voltage to the motor 5.

According to the present embodiment explained above, there is provided an electronic control unit 200 (seatbelt control device) controlling a seatbelt system 100 for a system provided with a seatbelt 1 for restraining a seated passenger at a seat, a spool 2 for taking up the seatbelt 1, a spiral spring 3 (elastic member) imparting to the spool 2 a force making the spool 2 rotate in a belt takeup direction when the seatbelt 1 is pulled out, a motor 5 able to operate forward and operate in reverse, and a force transmission mechanism 4 configured to make the spool 2 rotate in the belt takeup direction when making the motor 5 operate forward and to disconnect the spool 2 and the motor 5 when making the motor 5 operate in reverse. This is provided with a kinesthetic warning control part 201 changing a tightness of the seatbelt 1 against the seated passenger to thereby warn the seated passenger kinesthetically by the seatbelt, Further, the kinesthetic warning control part 201 is provided with a fitting operation part 202 performing a fitting operation controlling the time of making the motor 5 operate forward based on the value of the current flowing through the motor 5 (motor current value) when making the motor 5 operate forward and controlling a tightness of the seatbelt 1 to a predetermined initial belt tightness and a kinesthetic warning operation part 203 performing a kinesthetic warning operation making the tightness of the seatbelt 1 rise in stages from the initial belt tightness by repeating a forward operation making the motor 5 operate forward and at least one operation of a braking operation short-circuiting terminals of the motor 5 to render the motor 5 a short brake state or a reverse operation making the motor operate in reverse and is configured to perform the fitting operation before performing the kinesthetic warning operation.

Specifically, the fitting operation part 202 is configured to make the time for making the motor 5 operate forward the time until the motor current value reaches a predetermined fitting current value.

Further, the kinesthetic warning operation part 203 is configured to consecutively perform a forward operation controlling the voltage supplied to the motor 5 to a predetermined first warning voltage for exactly a predetermined first time to make the motor 5 operate forward and a braking operation short-circuiting terminals of the motor 5 for exactly a predetermined braking operation time to render the motor 5 a short brake state consecutively in the order of the forward operation and braking operation and to repeat the series of these operations a plurality of times.

Due to this, it is possible perform a kinesthetic warning operation after controlling the belt tightness to a constant initial belt tightness at all times by a fitting operation. For this reason, when performing a kinesthetic warning operation, it is possible to keep a seated passenger from being excessively fastened by the seatbelt 1 or keep the seated passenger from being unable to be sufficiently fastened by the seatbelt 1 and the effect of the kinesthetic warning from falling.

Further, according to the present embodiment, by performing the kinesthetic warning operation, it is possible to gradually raise the belt tightness to gradually strengthen the fastening due to the seatbelt 1. Therefore, it is possible to raise the degree of alertness due to the kinesthetic warning in stages, so it is possible to perform a kinesthetic warning flexibly and raise the effect of the kinesthetic warning Further, the kinesthetic warning control part 201 according to the present embodiment is further provided with a release operation part 204 performing a release operation making the motor 5 operate in reverse to disconnect the spool 2 and the motor 5 and is configured so as to perform the release operation after performing the kinesthetic warning operation.

Due to this, the seatbelt 1 is naturally pulled out by the reaction force received by the seatbelt 1 from the seated passenger. For this reason, after performing the kinesthetic warning operation, without making the seated passenger himself adjust the amount of belt pullout, it is possible to return the state from one where the seatbelt 1 is in the process of fastening the seated passenger to one where it is suitably fastening him (initial belt tightness).

Second Embodiment

Next, a second embodiment of the present disclosure will be explained. This embodiment differs from the first embodiment in the configuration of the kinesthetic warning operation part 203. Below, this point of difference will be focused on in the explanation.

Figure 4:
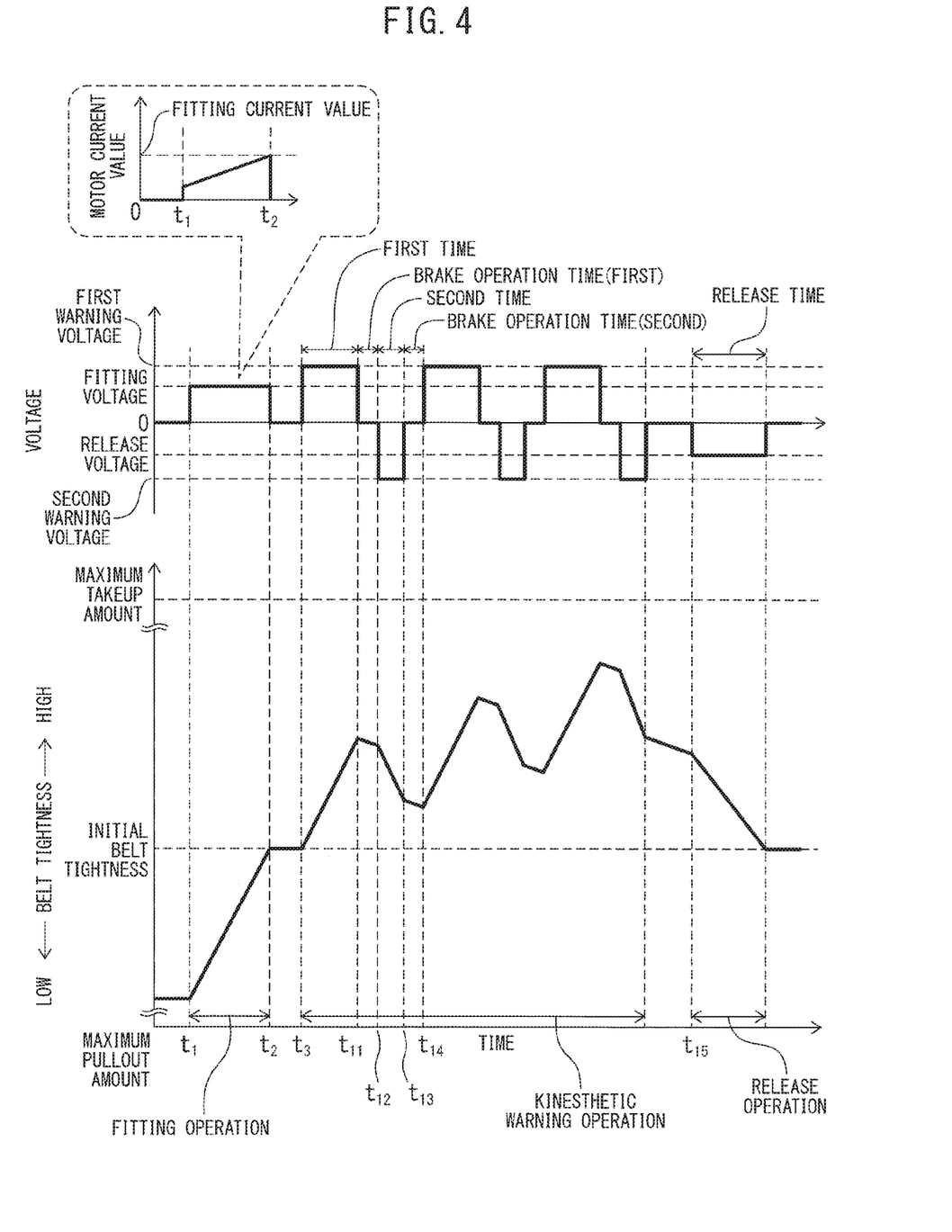
FIG. 4 is a time chart explaining an operation of kinesthetic warning control according to a second embodiment of the present disclosure.

FIG. 4 is a time chart for explaining the operation of kinesthetic warning control according to the present embodiment.

In the above-mentioned first embodiment, if the kinesthetic warning operation was started at the time t3, a forward operation making the motor 5 operate forward and a braking operation short-circuiting the terminals of the motor 5 to render the motor 5 a short brake state were alternately repeated to raise the belt tightness in stages.

As opposed to this, in the present embodiment, as shown in FIG. 4, at the time of the kinesthetic warning operation, a reverse operation making the motor 5 operate in reverse is performed between braking operation periods short-circuiting the terminals of the motor 5 to render the motor 5 a short brake state.

That is, in the present embodiment, if at the time t3 the kinesthetic warning operation is started, the electronic control unit 200, in the same way as the first embodiment, first performs an operation controlling the motor supply voltage to a predetermined first warning voltage (positive voltage)

for exactly a predetermined first time from the time t3 (for example, tens to hundreds of ms) and making the spool rotational shaft 21 rotate in the takeup direction by the motor 5 to take up the seatbelt 1. That is, it performs an operation fastening a seated passage by the seatbelt 1 for exactly the first time.

Next, starting from the time t11 after controlling the motor supply voltage to the first warning voltage for exactly the first time, the electronic control unit 200 short-circuits the terminals of the motor 5 for, for example, a predetermined braking operation time (for example tens to hundreds of ms) to render the motor 5 a short brake state and make the motor output shaft 51 stop and keep the motor output shaft 51 from freely rotating after making it stop. Due to this, at the time t11 on, in the same way as the first embodiment, the belt tightness falls toward the initial belt tightness.

At this time, in the present embodiment, starting from the time t12 after the elapse of exactly a predetermined braking operation time from the time t11, the electronic control unit 200 controls the motor supply voltage to a predetermined second warning voltage (negative voltage) for exactly a predetermined second time (for example tens to hundreds of ms) and uses the motor 5 to make the spool rotational shaft 21 rotate in the pullout direction to make a force in a direction pulling out the seatbelt 1 temporarily act on the seatbelt 1. At this time, the clutch 41 of the force transmission mechanism 4 may be disengaged to disconnect the spool rotational shaft 21 and the motor output shaft 51. Due to this, it is possible to increase the speed of drop of the belt tightness compared with the braking operation period from the time t11 to the time t12.

Further, at the time t13 after the elapse of exactly the second time from the time t12, the electronic control unit again short-circuits the terminals of the motor 5 for exactly a predetermined braking operation time (for example, 15 ms) to render the motor 5 a short brake state and slows the speed of drop of belt tightness.

Further, starting from the time t14 after the elapse of exactly the braking operation time from the time t13, the electronic control unit again controls the motor supply voltage to the first warning voltage for exactly the first time to repeat this series of operations, that is, the forward operation making the motor 5 operate forward, the braking operation rendering the motor 5 a short brake state, a reverse operation making the motor 5 operate in reverse, and a braking operation rendering the motor 5 a short brake state. In the present embodiment, repetition of this series of operations three times is counted as one kinesthetic warning operation and a total of one kinesthetic warning operation is performed, but in the same way as the first embodiment, the kinesthetic warning operation may also be performed consecutively a plurality of times (for example, three times).

Further, in the present embodiment as well, the first braking operation time, the second time, and the second braking operation time are set so that the belt tightness does not fall to the initial belt tightness in the period from the time t11 to the time t14.

By doing this as well, in the same way as the first embodiment, it is possible to gradually raise the belt tightness to gradually strengthen the fastening action by the seatbelt 1. Therefore, it is possible to raise the degree of alertness due to the kinesthetic warning in stages, so it is possible to perform the kinesthetic warning flexibly to raise the effect of the kinesthetic warning. Further, it is possible to make the amount of drop of belt tightness after raising the belt tightness (amount of belt pullout) greater compared with the first embodiment, so it is possible to perform the kinesthetic warning even more flexibly.

Further, at the time t15 after performing a kinesthetic warning operation, the electronic control unit 200, in the same way as the first embodiment, performs a release operation for naturally returning the belt tightness raised by performing the kinesthetic warning operation toward the initial belt tightness.

Note that, in the present embodiment, at the time of the kinesthetic warning operation, the kinesthetic warning operation part 203 was made to perform a reverse operation making the motor 5 operate in reverse between braking operation periods short-circuiting the terminals of the motor 5 to render the motor 5 a short brake state, but it is also possible to not perform the braking operation but alternately repeat the forward operation and reverse operation.

The kinesthetic warning operation part 203 according to the present embodiment explained above is configured to consecutively perform a forward operation controlling the voltage supplied to the motor 5 to a predetermined first warning voltage for exactly a predetermined first time to make the motor 5 operate forward, a braking operation short-circuiting terminals of the motor 5 for exactly a predetermined braking operation time to render the motor 5 a short brake state, and a reverse operation controlling the voltage supplied to the motor 5 to a predetermined second warning voltage for exactly a predetermined second time to make the motor 5 operate in reverse in the order of the forward operation, braking operation, reverse operation, and braking operation and repeat this series of operations a plurality of times.

Due to this, effects similar to the first embodiment are obtained. In addition, the amount of drop of belt tightness after raising the belt tightness (amount of belt pullout) can be increased compared with the first embodiment, so it is possible to perform a kinesthetic warning more flexibly.

Above, embodiments of the present disclosure were explained, but the above embodiments only show some of the applications of the present disclosure and are not meant to limit the technical scope of the present disclosure to the specific constitutions of the above embodiments.

For example, in the above embodiments, the number of times of performing the kinesthetic warning operation was not particularly limited. The operation need only be performed one time or more. Further, the number of times the series of operations in one kinesthetic warning operation is repeated is also not particularly limited.

Further, in the above first embodiment, the first warning voltages at the three kinesthetic warning operations were all made the same voltage values, but they may also be made different voltage values. For example, the first warning voltage of the second kinesthetic warning operation may be made smaller than the first warning voltage of the first kinesthetic warning operation and the first warning voltage of the third kinesthetic warning operation may be made smaller than the first warning voltage of the second kinesthetic warning operation or otherwise the first warning voltage may be made smaller to make the amount of belt takeup gradually smaller each time the number of times of the kinesthetic warning operation is increased. Further, conversely, the first warning voltage may be made gradually larger to make the amount of belt takeup gradually greater each time the number of times of the kinesthetic warning operation is increased.

The invention claimed is:
1. A seatbelt control device for a seatbelt system, the seatbelt system comprising:

a seatbelt configured to restrain a seated passenger at a seat;

a spool configured to take up the seatbelt;

an elastic member configured to impart to the spool a force making the spool rotate in a belt takeup direction when the seatbelt is pulled out;

a motor configured to be able to operate forward and operate in reverse; and a force transmission mechanism configured to make the spool rotate in the belt takeup direction when making the motor operate forward and to disconnect the spool and the motor when making the motor operate in reverse, wherein the seatbelt control device comprises a kinesthetic warning control part configured to change a tightness of the seatbelt against the seated passenger to thereby warn the seated passenger kinesthetically by the seatbelt, and the kinesthetic warning control part comprises:

a fitting operation part configured to perform a fitting operation controlling the time of making the motor operate forward based on the value of the current flowing through the motor when making the motor operate forward and controlling a tightness of the seatbelt to a predetermined initial belt tightness; and a kinesthetic warning operation part configured to perform a kinesthetic warning operation making the tightness of the seatbelt rise in stages from the initial belt tightness by repeating a forward operation making the motor operate forward and at least one operation of a braking operation short-circuiting terminals of the motor to render the motor a short brake state or a reverse operation making the motor operate in reverse, and the kinesthetic warning control part is configured to perform the fitting operation before performing the kinesthetic warning operation.

2. The seatbelt control device according to claim 1, wherein the kinesthetic warning control part further comprises a release operation part configured to make the motor operate in reverse to disconnect the spool and the motor and is configured to perform the release operation after performing the kinesthetic warning operation.

3. The seatbelt control device according to claim 1, wherein the fitting operation part makes the time making the motor operate forward the time until the current value reaches a predetermined fitting current value.

4. The seatbelt control device according to claim 1, wherein the kinesthetic warning operation part is configured to consecutively perform the forward operation controlling the voltage applied to the motor to a predetermined first warning voltage for exactly a predetermined first time and the braking operation short-circuiting terminals of the motor for exactly a predetermined braking operation time to render the motor a short brake state in the order of the forward operation and the braking operation and repeating the series of operations a plurality of times.

5. The seatbelt control device according to claim 1, wherein the kinesthetic warning operation part is configured to consecutively perform a forward operation controlling the voltage applied to the motor to a predetermined first warning voltage for exactly a predetermined first time to make the motor operate forward, a braking operation short-circuiting terminals of the motor for exactly a predetermined braking operation time to render the motor a short brake state, and a reverse operation controlling the voltage applied to the motor to a predetermined second warning voltage for exactly a predetermined second time to make the motor operate in reverse in the order of the forward operation, braking operation, reverse operation, and braking operation and repeat this series of operations a plurality of times.

\* \* \* \* \*